W. A. MACAN.
PIPE COVERING.
APPLICATION FILED APR. 4, 1913.
1,134,475.
Patented Apr. 6, 1915.
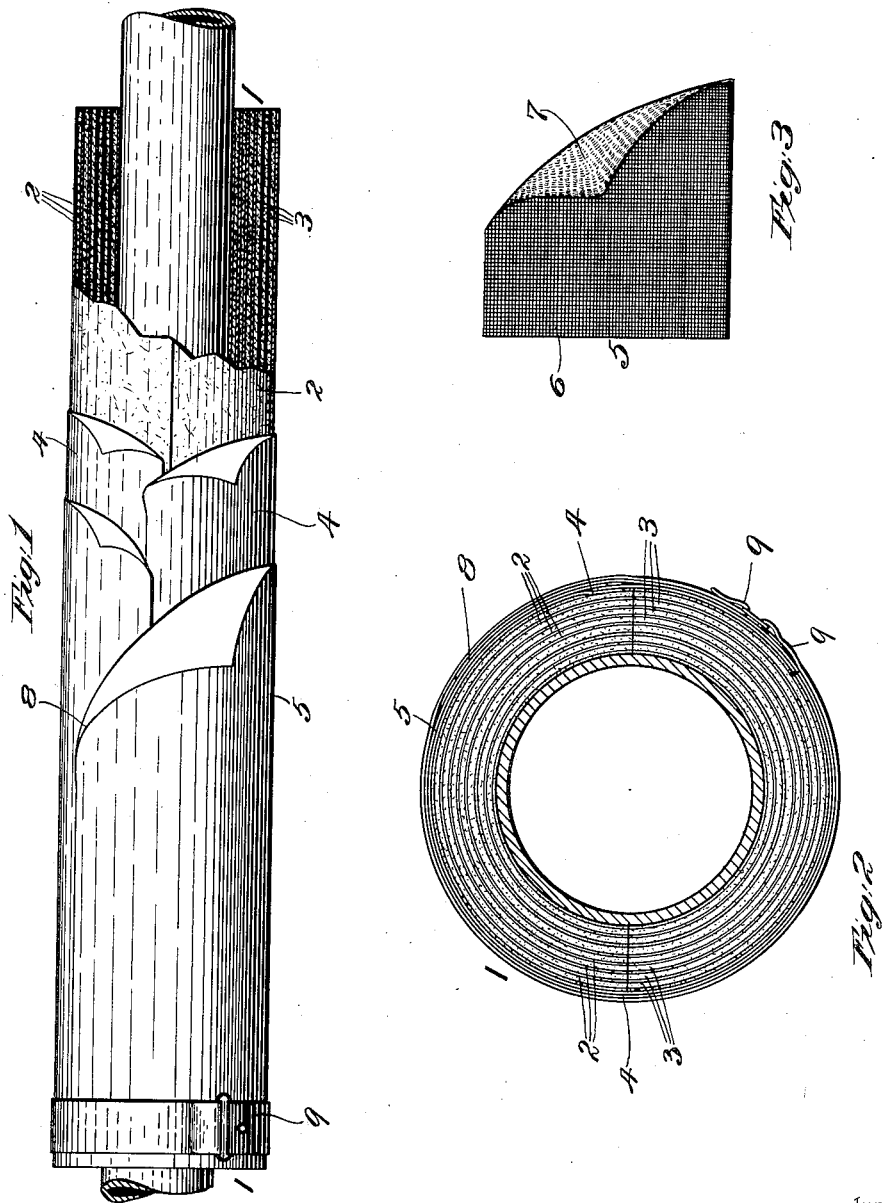
Inventor
William A Macan
By William J Jackson
Attorney

UNITED STATES PATENT OFFICE.

WILLIAM A. MACAN, OF RIDLEY PARK, PENNSYLVANIA, ASSIGNOR TO EHRET MAGNESIA MANUFACTURING COMPANY, OF VALLEY FORGE, PENNSYLVANIA, A CORPORATION OF PENNSYLVANIA.

PIPE-COVERING.

1,134,475.  Specification of Letters Patent.  Patented Apr. 6, 1915.

Application filed April 4, 1913. Serial No. 758,896.

*To all whom it may concern:*

Be it known that I, WILLIAM A. MACAN, a citizen of the United States, residing at Ridley Park, in the county of Delaware and State of Pennsylvania, have invented a certain new and useful Improved Pipe-Covering, of which the following is a specification.

Coverings for the insulation of steam, water and other pipes, broadly stated, are of two kinds, to wit: those used for installation indoors and those used for installation out-of-doors. The first-mentioned coverings are not exposed to changing weather conditions and therefore are amply protected as at present manufactured. The last mentioned coverings, however, or those installed out-of-doors, require protection against changing weather conditions. As at present practised in the trade, three methods are employed for protecting against the elements said pipe coverings when installed out-of-doors. By one method, the pipe covering, which as at present manufactured, is equipped with an exterior cotton jacket, has placed therearound an extra jacket of canvas, which is sewn on the covering and this canvas jacket is painted with two or more coats of paint. By another method the pipe covering has placed therearound a sheet iron jacket retained at intervals of from four to six inches by means of suitably secured iron straps. By still another method, the pipe covering has placed therearound what is known in the trade as "roofing", either of saturated asbestos paper or saturated wool felt of three or four ply secured to place at intervals of every four inches by means of copper or galvanized wire. It will be at once apparent by reason of this practice, that in addition to the purchase of the pipe covering as now manufactured, it is required that additional materials be purchased and that additional labor be required for protecting the pipe coverings against the weather, thus adding materially to the initial cost of installation. In addition to this fact, it may be stated that while the pipe coverings themselves may be installed in a large percentage of instances, approximately 70 per cent. by unskilled labor, the weather proofing thereof, by any of the above-mentioned methods, cannot be satisfactorily and efficiently accomplished by the same class of labor. If effective, economic, weather proofing of pipe coverings as now manufactured is desired, it is under present methods as necessary to employ skilled labor as it is necessary to purchase the weather proofing materials themselves.

This invention has for its principal object to overcome these disadvantageous features and to provide a weather proofed pipe covering for out-of-door use which may be easily and cheaply manufactured and assembled at the factory and shipped ready for use as a complete article of manufacture, which may be installed as thus shipped in most instances by unskilled labor.

A further object of the present invention is to provide a pipe covering for out-of-door use equipped with a weather proofed jacket of fabric coated with an elastic gum-like substance which is applied at the time of manufacture of said covering, whereby the purchaser receives a complete weather proofed pipe covering which can be readily installed by unskilled labor at a minimum saving of 20 per cent. over the present method of weather proofing pipe coverings.

A still further object of the present invention is to provide a pipe covering weather proofed at the time of its manufacture, which may be marketed so weather proofed to eliminate the necessity, cost and inconvenience of purchasing additional weather proofing material with its consequential labor cost of applying said weather proofing material.

The invention, generally stated, comprises the improvements hereinafter described and finally claimed.

The nature, characteristic features and scope of the invention will be more fully understood from the following description, taken in connection with the accompanying drawing forming part hereof and in which:

Figure 1, is a view in elevation, partly sectioned, of the pipe covering embodying the invention, Fig. 2, is an end view thereof, drawn to an enlarged scale, and Fig. 3, is a fragmentary view illustrating the weather proofed fabric employed.

In the drawings there is disclosed a section of pipe covering 1, which may be of any standard make and is commonly made up of a pair of semi-circular pipe inclosing units comprising alternate layers of asbestos paper 2, and wool felt 3, said units being bound together by a cotton, muslin, drill, duck or like fabric 4, which serves as a hinge joint for said units during the installation period of the covering. As is well known in the art to which the present invention relates, this fabric 4, is cemented to the semi-circular units, at the place of manufacture, said fabric ends loosely overlapping the free edges of said units, which fabric ends are not cemented to place until after the complete covering has been fitted around a pipe. To properly weather proof such pipe covering according to the principles best known to be at this time for practising the invention, there is permanently applied directly over the fabric 4, at the factory, the the time of manufacture, an outer or auxiliary jacket of specially prepared weather proofed material 5. In practice good results have been obtained by using for this purpose a cloth of cotton, muslin, drill, duck, or like fabric 6, one face of which has applied thereto a thin coating of an elastic gum-like preparation 7, possessing weather resisting qualities and the other face of which may have previously applied thereto, if desired, an adhesive for readily applying the weather proofed material to the pipe covering 1 at the factory. Such weather proofed cloth is permanently applied directly over the ordinary jacket 4, at the time of manufacture of the complete pipe covering and is of sufficient size so that the free end 8, thereof together with the ends of the fabric 4, may be lapped over the meeting edges of the pipe inclosing units, opposite the hinged point thereof, at the time of installation of the covering 1, see Fig. 2. It may be here remarked that said weather proofed cloth may be finished in various colors to meet desired requirements and being relatively elastic is aptly fitted for the purposes intended. When installed the pipe covering above described has adjusted thereto the usual metallic bands 9.

Among the advantages connected with the above described improved pipe covering, mention may be made of the great ease with which its component parts may be assembled at a factory and shipped to destination ready for installation, as a complete article of manufacture possessing weather proofing qualties; the ease with which the purchaser, through unskilled labor, may install said covering, in an economical manner; the generally efficiency, neatness and uniformity of the covering upon installation, and the fact that the purchaser of said pipe covering can as readily and economically install said pipe covering, as ordinary indoor pipe coverings not exposed to the weather can be installed.

Having thus described the nature and objects of the invention, what I claim as new and desire to secure by Letters Patent is:—

As a new article of manufacture a sectional pipe covering embracing a pair of semi-cylinders of non-conductive material having a flexible jacket of fabric for binding the same together and an outer jacket of fine mesh fabric exteriorly coated with an elastic gum-like substance permanently applied to the flexible jacket at the time of manufacturing said sectional covering, the edges or flaps of said flexible jacket and said outer jacket being free for later application.

In testimony whereof, I have hereunto signed my name.

W. A. MACAN.

Witnesses:
WILLIAM J. JACKSON,
AGNES E. CASKEY.